Sept. 18, 1934.   P. M. BOURDON   1,974,009
ARRANGEMENT FOR BALANCING LOADS CARRIED BY TWIN TIRES
Filed March 24, 1933
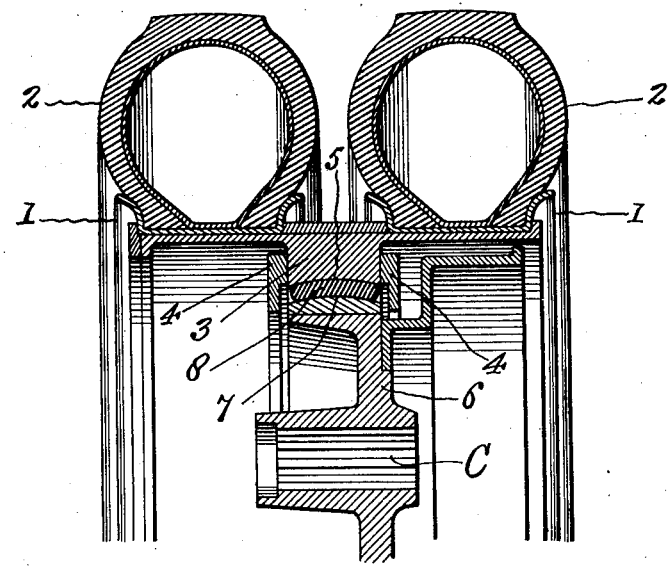
Inventor
Pierre Marcel Bourdon
By Wilkinson & Mawhinney
Attorneys.

Patented Sept. 18, 1934

1,974,009

UNITED STATES PATENT OFFICE 1,974,009

ARRANGEMENT FOR BALANCING LOADS CARRIED BY TWIN TIRES

Pierre Marcel Bourdon, Paris, France, assignor to Michelin et Cie, Clermont-Ferrand, France, a corporation of France Application March 24, 1933, Serial No. 662,586
In France November 25, 1932

4 Claims. (Cl. 152—36)

The present invention relates to improvements in arrangement for balancing loads carried by twin tires.

When wheels are provided with twin tires, frequently the two tires support unequal loads, because of the camber or crown of the road or because of irregularities or inequalities in the ground or pavement. The invention has for an object an arrangement to avoid this difference in loads on the twin tires and to balance, as far as possible, the loads carried by the two tires.

With this in view, there is provided, between the axle and the double rims which carry the tires, a joint, such as a ball and socket or universal joint, said joint enabling the rim ensemble to partake of an oscillating movement about an axis in a plane perpendicular to the axle, or in other words, the twin tires are permitted to move transversely of the roadway.

Due to this arrangement, the twin rim assembly is enabled to place itself in such a position that the reactions of the two tires on the ground are the same, and consequently the loads carried by the two tires are balanced. Preferably there is placed between the two elements of the universal joint an elastic material which may be fixed to the elements by adhesion or in any other manner, this elastic material dispensing with lubrication between the surfaces of the ball and socket joint, and at the same time preventing the entry of dust, dirt, etc. into said elements and which assures the driving of the rims by the axle. Of course this same purpose may be carried out in other ways by any appropriate arrangement that permits a sufficient play and relative movement between the elements of the ball and socket joint.

With the foregoing and other objects in view, the invention will be more fully described hereinafter and will be more particularly pointed out in the claims appended hereto.

The figure represents a fragmentary vertical transverse section taken through a wheel constructed according to the present invention.

Referring more particularly to the drawing, the double rim or two rims are designated at 1. These rims contain the pneumatic or other tires 2 and such rims are mounted on a rim carrier or member 3 having a spherical surface 5 constituting the female element of the ball and socket joint. The male element is carried by a part or flange 6 which may be made in one piece, or affixed to the hub or an extension of the hub, this part having a spherical surface 7 which constitutes the male element of the ball and socket joint, these two spherical surfaces having a common axis C. There is inserted between the two spherical surfaces 5 and 7 an appropriate elastic material 8, which is cemented to, or otherwise caused to adhere to, the surfaces 5 and 7. The elastic deformations of this material 8 allow play, clearance and flexibility in the universal joint.

In the drawing, there is shown at 4 cheeks acting as abutments to limit the movement of the ball and socket joint and preventing to a certain extent the entrance of dust, dirt, etc. into contact with the elastic material 8. The cheeks 4 are preferably secured to the rim carrier 3 and have cut-away portions opposite the elastic material 8 and male member 7 in order to allow the desired clearance within limits. It is to be understood that the invention is not limited to the form of device described and shown but relates broadly to the use of a ball and socket or universal joint between the axle and the rims, thus permitting an oscillation or displacement in a direction perpendicular to the axis of the axle. While the elastic material is preferably interposed between the two elements of the joint, this is not necessary, but it will dispense with the use of lubricant and assure the driving of the rims in a proper direction. The surfaces 5 and 7, instead of being spherical, may be of any other form desired.

It will be obvious that various changes in the construction, combination and arrangement of parts could be made, which could be used without departing from the spirit of my invention, and I do not mean to limit the invention to such details except as particularly pointed out in the claims.

Having thus described my invention, what I claim and desire to secure by Letters Patent of the United States is:—

1. In a device for balancing the load upon twin tires comprising a rim carrier provided with an outer runway to support a pair of tires, said rim carrier having an inwardly projecting rib adjacent the central portion thereof and cut away to present a spherical surface, a hub having an outer spherical surface to aline in spaced relation with the spherical surface on the rim carrier to form a circular passageway, elastic material for filling the passageway, said elastic material secured to the rim carrier and the hub, and a pair of cheeks having their inner portion cut away secured to the rib and placed to overlap the elastic material whereby to protect the same, and to limit the amplitude of movement of the rim carrier.

2. A device for balancing the load upon twin tires comprising a rim carrier having an inwardly projecting rib provided with a spherical surface on its inner face, a hub having an outer spherical surface spaced inwardly from the spherical surface of the rib, elastic material between said spherical surfaces, and a rigid cheek secured to each side of the rib and projecting inwardly to span the gap at the sides of the space occupied by the elastic material, the cheeks being spaced away from the sides of the elastic material.

3. A device for balancing the load upon twin tires comprising a rim carrier having an inwardly projecting rib provided with a spherical surface on its inner face, a hub having an outer spherical surface spaced inwardly from the spherical surface on the rib, elastic material between said spherical surfaces, and a cheek secured to each side wall of the rib and projecting radially inward therefrom to span the gap at the side of the elastic material, said rib being rigid and having on its interior wall opposite the elastic material a cut-away portion which spaces the cheek both from the elastic material and from the hub in an axial direction whereby said rigid cheeks allow a limited rocking movement of the rim carrier with reference to the hub before the walls of the cut-away portions of said ribs come into engagement with the hub to arrest such rocking movement.

4. A device for balancing the load upon twin tires comprising a rim carrier having a spherical surface, a hub also having a spherical surface complementing that of the first mentioned spherical surface, and spaced radially therefrom, a body of elastic material having mating inner and outer spherical surfaces affixed to the first mentioned spherical surfaces, and means supported in spaced relation at the sides of the elastic body for housing and protecting the elastic body and for cooperating with said rim carrier and hub to restrict the lateral rocking movement of the rim carrier on the hub beyond a predetermined maximum.

PIERRE MARCEL BOURDON.